United States Patent
Cheng

(10) Patent No.: US 8,874,830 B2
(45) Date of Patent: Oct. 28, 2014

(54) METHOD FOR CONTROLLING MEMORY ARRAY OF FLASH MEMORY, AND FLASH MEMORY USING THE SAME

(75) Inventor: Chang-Kai Cheng, Hsinchu (TW)

(73) Assignee: Silicon Motion, Inc., Jhubei, Hsinchu County (TW)

( * ) Notice: Subject to any disclaimer, the term of this patent is extended or adjusted under 35 U.S.C. 154(b) by 257 days.

(21) Appl. No.: 13/525,519

(22) Filed: Jun. 18, 2012

(65) Prior Publication Data

US 2013/0145078 A1 Jun. 6, 2013

(30) Foreign Application Priority Data

Dec. 1, 2011 (TW) .............................. 100144122 A

(51) Int. Cl.
*G06F 12/00* (2006.01)

(52) U.S. Cl.
USPC ........... 711/103; 711/114; 711/156; 711/173; 707/813

(58) Field of Classification Search
USPC ................... 711/103, 156, 173; 707/813–820
See application file for complete search history.

(56) References Cited

U.S. PATENT DOCUMENTS

2007/0143567 A1 6/2007 Gorobets
2012/0023144 A1* 1/2012 Rub .............................. 707/813

FOREIGN PATENT DOCUMENTS

TW 200532706 10/2005
TW 200949841 12/2009

OTHER PUBLICATIONS

English language translation of abstract of TW 200532706 (published Oct. 1, 2005).
English language translation of abstract of TW 200949841 (published Dec. 1, 2009).

* cited by examiner

*Primary Examiner* — Shawn X Gu
(74) *Attorney, Agent, or Firm* — McClure, Qualey & Rodack, LLP

(57) ABSTRACT

A control method for a Flash memory array and a Flash memory is disclosed. The Flash memory array includes a plurality of blocks which are classified into groups and each group includes at least one block. The control method includes the steps of: recognizing an attribute of data transferred from a host, obtaining a storage group selected from the groups based on the attribute of the data, and storing the data into the blocks of the storage group and thereby the blocks of a same group store data of a same attribute; and performing a valid data collection, restricted to the blocks belonging to a same group, to release blocks of space.

14 Claims, 8 Drawing Sheets

METHOD FOR CONTROLLING MEMORY ARRAY OF FLASH MEMORY, AND FLASH MEMORY USING THE SAME

CROSS REFERENCE TO RELATED APPLICATIONS

This Application claims priority of Taiwan Patent Application No. 100144122, filed on Dec. 1, 2011, the entirety of which is incorporated by reference herein.

BACKGROUND OF THE INVENTION

1. Field of the Invention

The present invention relates to a Flash memory and in particular relates to a control method for a storage array of a Flash memory.

2. Description of the Related Art

Flash memory is a general non-volatile storage device that is electrically erased and programmed A NAND Flash, for example, is primarily used in memory cards, USB flash devices, solid-state drives, and so on.

A storage array of a NAND Flash comprises a plurality of blocks, and, all cells of an entire block have to be erased at once. To release a used block as a spare block, the entire block has to be erased. "Garbage Collection" is operative to collect valid data distributed over several blocks and, after collecting the valid data, the blocks containing only invalid data can be erased and released as spare blocks.

However, "Garbage Collection" conventionally requires considerable resources for calculation. A method for efficiently operating a Flash memory is called for.

BRIEF SUMMARY OF THE INVENTION

A Flash memory and a control method for a storage array of a Flash memory are disclosed.

A storage array of a Flash memory is operated according to the disclosed method. The storage array includes a plurality of blocks which are classified into groups, wherein each group contains at least one block. The disclosed method comprises the steps as follows: recognizing an attribute of data provided from a host; obtaining a storage group selected from the groups based on the attribute of the data; storing the data in the blocks of the storage group and thereby the blocks of a same group store data of a same attribute; and, performing a valid data collection, restricted to the blocks belonging to a same group, to release blocks of space.

A Flash memory in accordance with an exemplary embodiment of the invention comprises a Flash memory storage array and a control unit. The Flash memory storage array includes a plurality of blocks which are classified into groups, wherein each group contains at least one block. The control unit is placed between the Flash memory storage array and a host, and has an attribute classified write controller and an attribute classified block management unit. The attribute classified write controller recognizes an attribute of data provided from the host and obtains a storage group selected from the groups based on the attribute of the data and stores the data in the blocks of the storage group and thereby the blocks of a same group store data of a same attribute. The attribute classified block management unit performs valid data collection process to release blocks of space, wherein the valid data collection process is restricted to the blocks belonging to a same group.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description show several exemplary embodiments carrying out the invention. This description is made for the purpose of illustrating the general principles of the invention and should not be taken in a limiting sense. The scope of the invention is best determined by reference to the appended claims.

Figure 1:
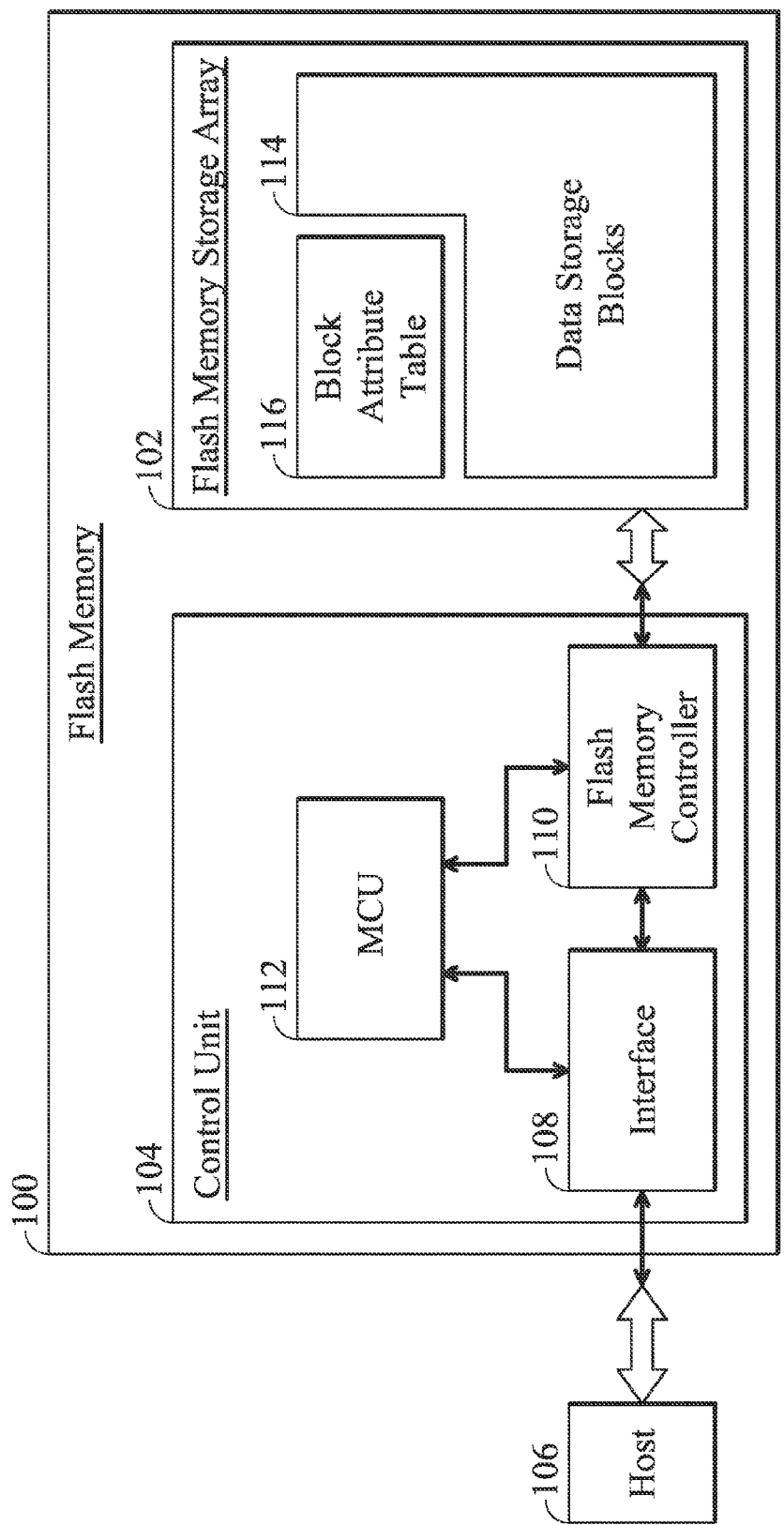
FIG. 1 is a block diagram, illustrating a Flash memory 100 in accordance with an exemplary embodiment of the disclosure.

FIG. 1 is a block diagram, illustrating a Flash memory 100 implemented in accordance with an exemplary embodiment of the disclosure. The Flash memory 100 comprises a Flash memory storage array 102 and a control unit 104.

The Flash memory storage array 102 is for data storage, which contains a plurality of blocks and all cells of an entire block have to be erased together. In an exemplary embodiment, the Flash memory storage array 102 may be implemented by NAND gates. In an exemplary embodiment, the Flash memory storage array 102 may include a plurality of blocks which are classified into groups, wherein each group contains at least one block.

The control unit 104 is placed between the Flash memory storage array 102 and the host 106. In the exemplary embodiment of FIG. 1, the control unit 104 uses an interface 108 for communication with the host 106 and contains a Flash memory controller 110 and a Microcontroller Unit (MCU) 112. With the control from the MCU 112, data transferred from the host 106 is received through the interface 108. According to a firmware, the MCU 112 instructs the Flash memory controller 110 to execute attribute classified write control and attribute classified block management on the Flash memory storage array 102, by which the data transferred from the host 106 is stored into the Flash memory storage array 102 and is properly managed.

Figure 2A:
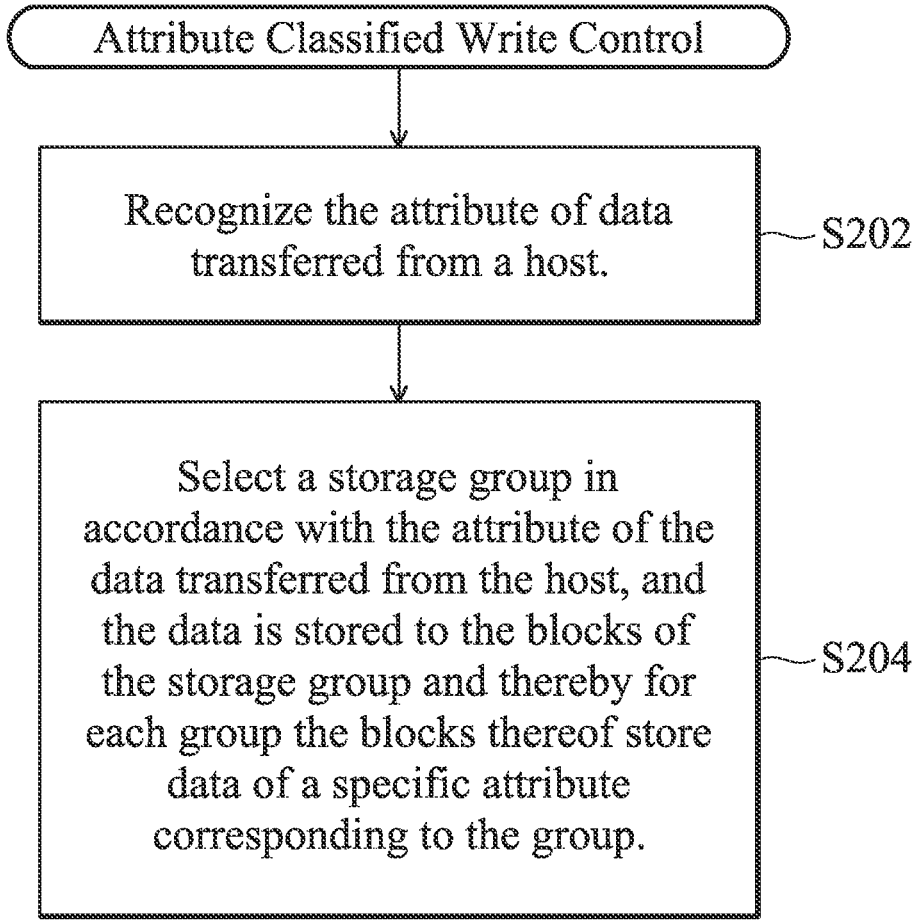
FIG. 2A is a flowchart depicting an attribute classified write control of the disclosure.

FIG. 2A is a flowchart depicting the attribute classified write control of the disclosure. In step S202, the attribute of the data transferred from the host 106 is recognized. In step S204, a storage group is selected from the groups provided in the storage array 102 in accordance with the attribute of the data transferred from the host 106, and the data transferred from the host 106 is stored to the blocks of the storage group and thereby for each group the blocks thereof store data of a specific attribute corresponding to the group.

Figure 2B:
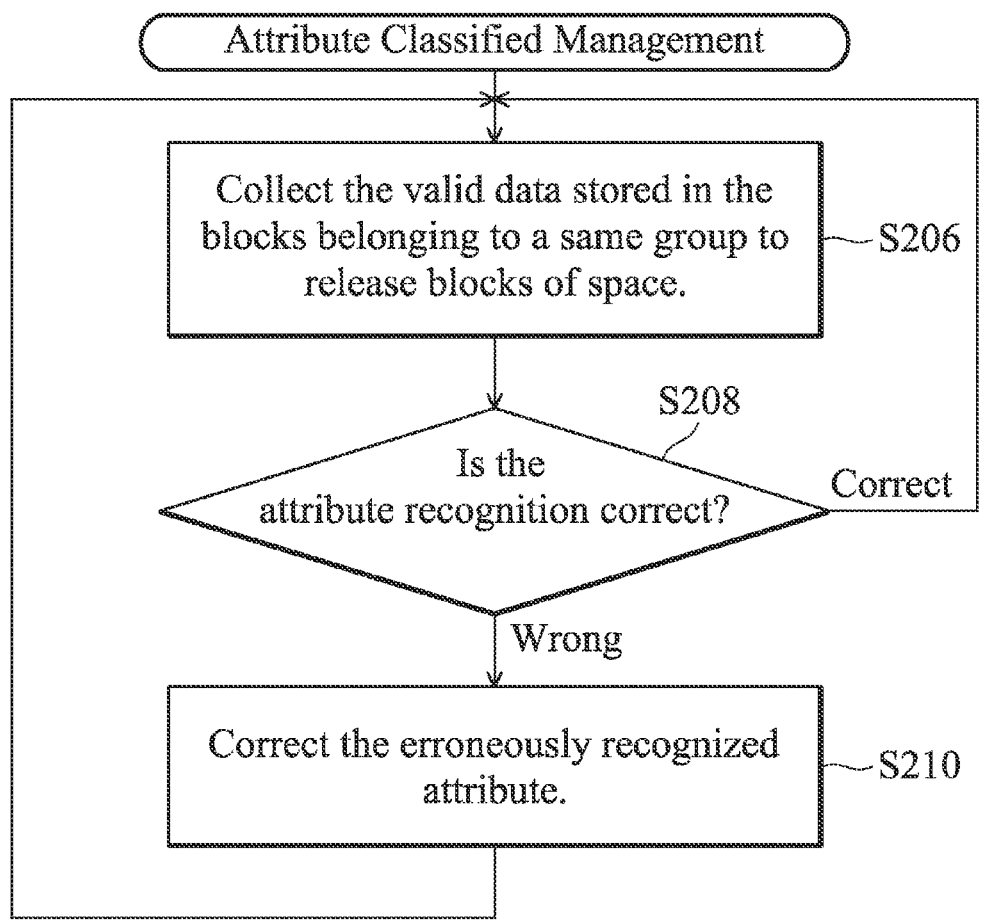
FIG. 2B is a flowchart depicting the attribute classified management of the disclosure.

FIG. 2B is a flowchart depicting the attribute classified management of the disclosure. In step S206, the valid data stored in the blocks belonging to a same group are collected to release blocks of space. In step S208, it is monitored whether the attribute recognition is correct. When the attribute recognition is incorrect, step S210 is performed to correct the error. Conversely, when no error is obtained, step S206 is performed to release blocks of space.

Note that the steps S208 and S210 are optional steps. Any procedure including the step S206 should be considered, when involving the attribute classified block management of the disclosure.

A more detailed discussion about the attribute classified write control and the attribute classified block management is shown below.

In an exemplary embodiment, when assigning a block for data storage, the attribute classified write control further labels the attribute of the assigned block. As shown in FIG. 1, in addition to the blocks for data storage (the data storage blocks 114), the Flash memory storage array 102 further provides a block (referring the block attribute table 116) for recording the attributes of the blocks 114. When a spare block is assigned to store host-side data, the block attribute table 116 may be refreshed accordingly to record the information that the assigned block corresponds to the attribute of the stored host-side data.

Further, the monitor procedure of step S208 of FIG. 2B may be implemented in various ways. In an exemplary embodiment, when the total number of blocks of a specific attribute exceeds an upper limit number, the attribute classified block management determines that the data of one of the blocks of the specified attribute has been erroneously recognized. In another exemplary embodiment, when the total number of spare blocks is lower than a lower limit number, the attribute classified block management determines that the data of one of the blocks of a specified attribute has erroneously been recognized.

Further, the correction procedure of step S210 of FIG. 2B is mainly implemented in two ways. In an exemplary embodiment, the attribute classified block management re-labels an attribute label of a block for correction of the erroneously recognized attribute of data stored in the block. For example, an attribute label stored in the block attribute table 116 to represent the attribute of data stored in a block may be re-labeled for attribute correction. In another exemplary embodiment, the attribute classified block management moves the data to another block which is assigned with an attribute which correctly corresponds to the data. In the procedure, the block previously stored with the data may be erased and released as a spare block, and, the block attribute table 116 may be corrected to be re-labeled indicating that the erased and released block is a spare block and does not correspond to any data attribute.

Furthermore, several exemplary embodiments about hierarchical classification of data attribute are disclosed.

Figure 3:
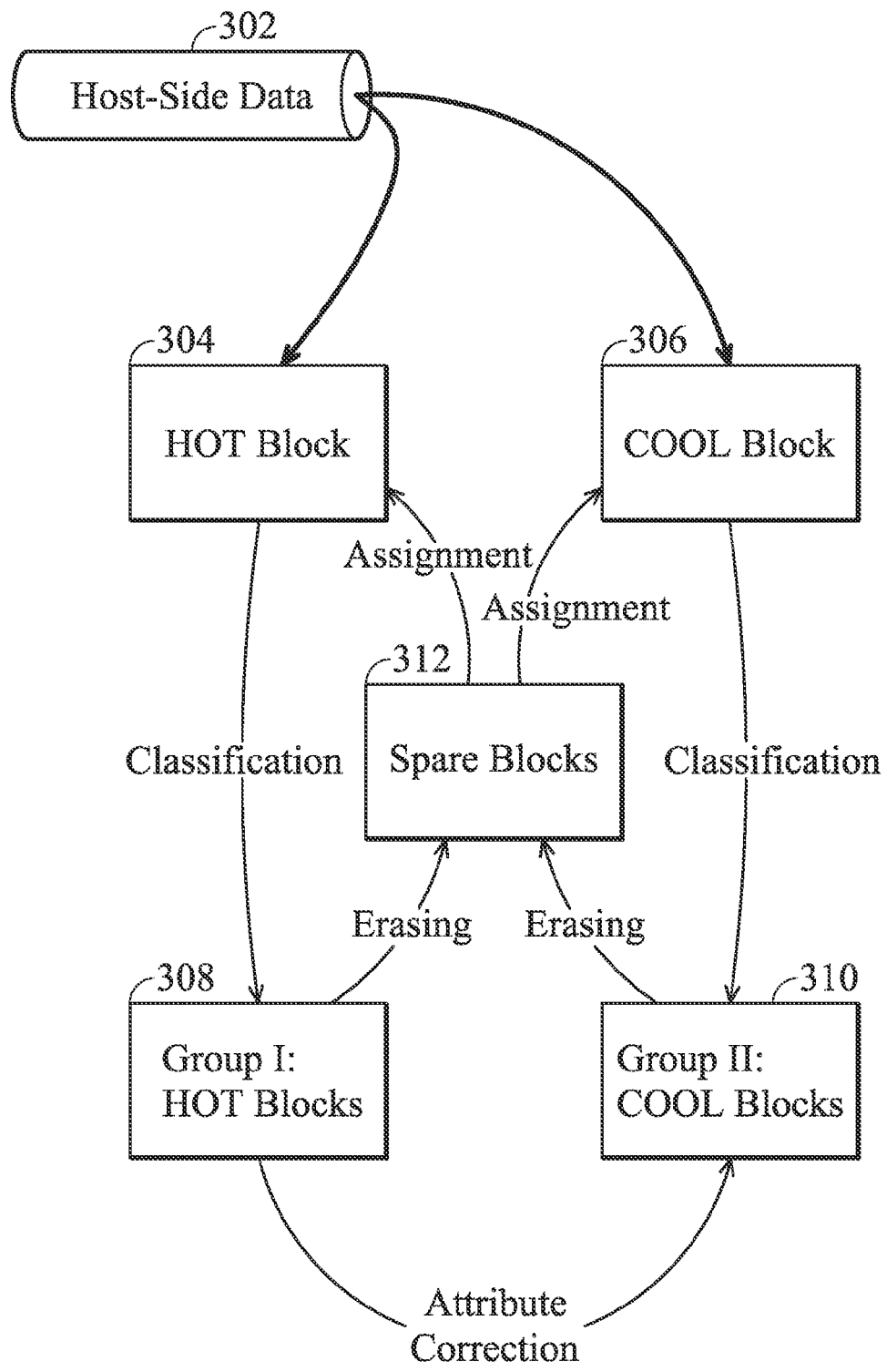
FIG. 3 is a flowchart depicting an attribute classified block management of the disclosure.

FIG. 3 depicts an exemplary embodiment of the disclosure, wherein the attribute of data depends on a data update rate. The data update rate may be obtained from at least the data size, the Logical Block Addressing (LBA), the data content, or the historical experience of the data write operation (for example, using a Fuzzy technique to analyze the historical data write operations to find out the data update rules). In some exemplary embodiments, small sized data may be regarded as random data, generally having a higher update rate and may be marked "HOT," and, large sized data may be regarded as sequential data, generally having lower update rate and may be marked "COOL." The host-side data 302 may be stored to the HOT block 304 or the COOL block 306, depending on the attribute (HOT or COOL) of the host-side data. The block 304, for the HOT attribute data, may be classified to group I (308). The block 306, for the COOL attribute data, may be classified to group II (310). According to the step 5206 of FIG. 2, valid data collection process is restricted to blocks belonging to a same group. For example, valid data between the blocks of group I are collected together, independent of the valid data collection of the blocks of group II. The blocks released during the valid data collection may be erased as spare blocks 312. The blocks assigned for data storage (e.g. the HOT block 304 or the COOL block 306) are selected from the spare blocks 312.

Furthermore, when the total number of blocks of group I (with HOT attribute) exceeds an upper limit number, the blocks of group I which have not been updated for a long time may be re-labeled as COOL blocks or, for the blocks of group I which have not been updated for a long time, the valid data may be moved to a block of group II which is of a COOL attribute. When the total number of spare blocks 312 is lower than a lower limit number, the blocks of group I which have not been updated for a long time may be re-labeled as COOL blocks or, for the blocks of group I which have not been updated for a long time, the valid data may be moved to a block of group II which is of a COOL attribute.

Figure 4A:
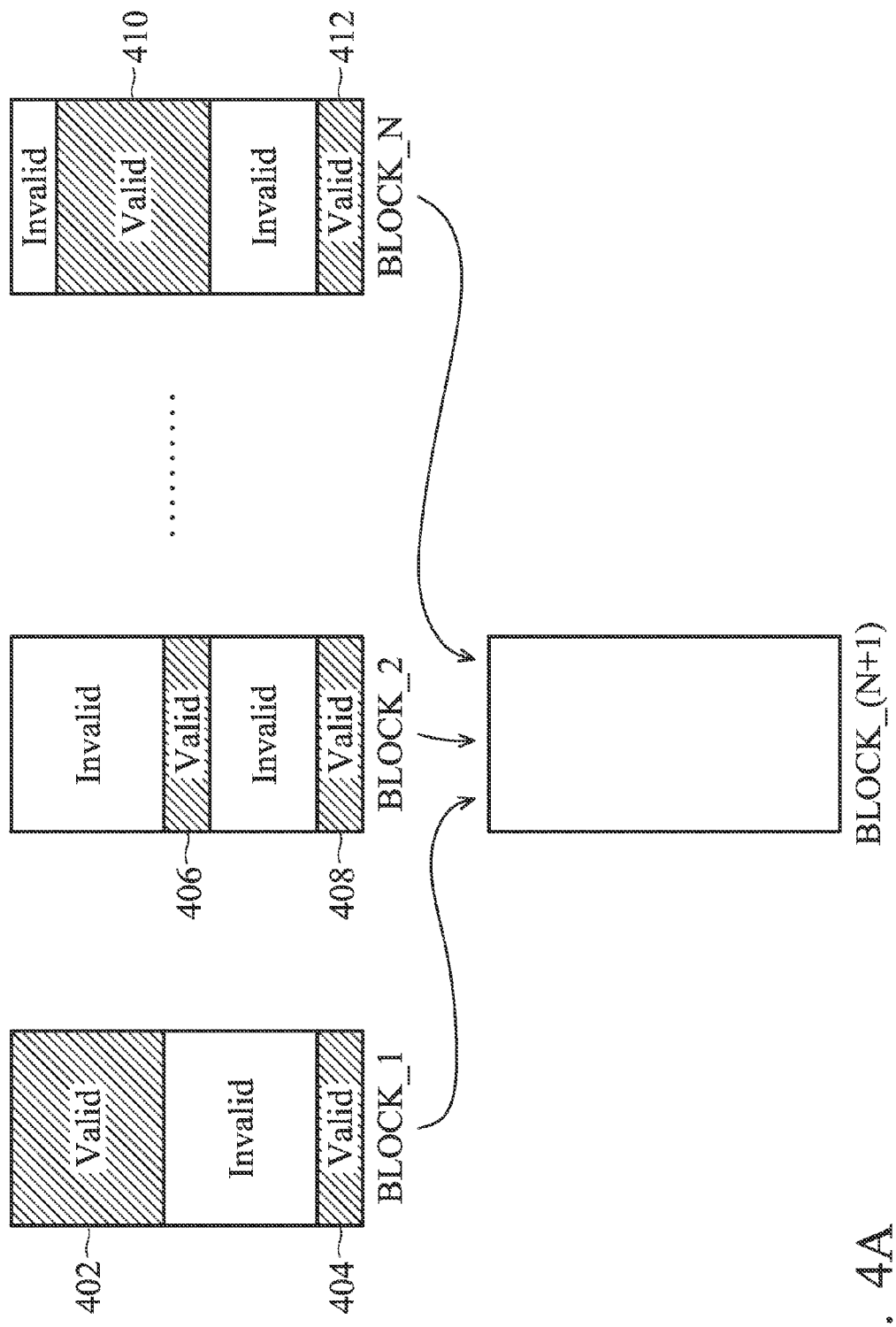
FIG. 4A and FIG. 4B show advantages of the disclosure.
Figure 4B:
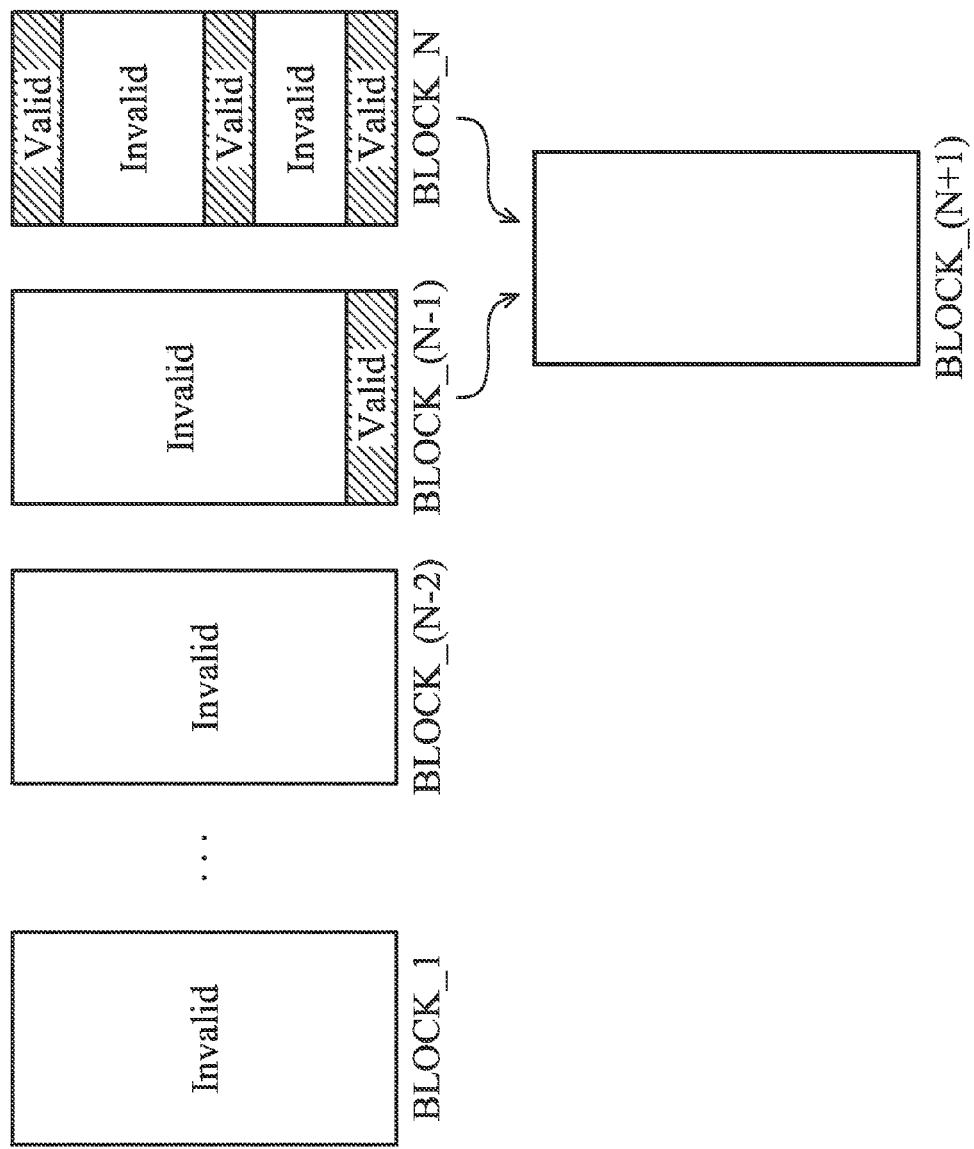

FIG. 4A and FIG. 4B show the advantages of the disclosure.

FIG. 4A depicts a garbage collection procedure according to a conventional technique, wherein, data of different attributes are not separately stored in the Flash memory storage array. As shown in FIG. 4A, system data 402 and 410 (of low update rates) and random data 404, 406, 408 and 412 (of high update rates) are distributed over the blocks BLOCK_1 to BLOCK_N. Note that between the blocks BLOCK_1 to BLOCK_N the invalid data are interlaced between the valid data because of the page mode operation for the NAND Flash memory, by which the previously recorded data turns to invalid data once a data refreshing process is performed wherein the refreshed data is stored in another space. When space release is requested, valid data within the blocks BLOCK_1 to BLOCK_N are collected to BLOCK_(N+1), and, the blocks BLOCK_1 to BLOCK_N in which invalid data remains are released as spare blocks. These operations consume a lot of system resources.

FIG. 4B depicts a garbage collection procedure in accordance with an exemplary embodiment of the disclosure, wherein the data of different attributes are stored separately, and garbage collection between blocks of different groups is not allowed. FIG. 4B focuses on the blocks of group I (taught in FIG. 3, for random data storage.) According to the page mode operation for NAND Flash memory (by which the previously recorded data are turned invalid once a data refreshing process is performed wherein the refreshed data is stored in another space,) data of previously used blocks BLOCK_1 to BLOCK_(N−2) have been updated and stored by recently used blocks BLOCK_(N−1) and BLOCK_N. Only invalid data remains in the previously used blocks BLOCK_1 to BLOCK_(N−2). Thus, the space of the blocks BLOCK_1 to BLOCK_(N−2) may be directly erased and released. It is not required to consume system resources for garbage collection of the blocks BLOCK_1 to BLOCK_(N−2). Only a few number of blocks, BLOCK_(N−1) and BLOCK_N, need the garbage collection procedure, to use the block BLOCK_(N+1) to collect the valid data scattered over the blocks BLOCK_(N−1) and BLOCK_N and thereby the blocks BLOCK_(N−1) and BLOCK_N can be released as spare blocks.

Comparing FIG. 4A and FIG. 4B, the operation efficiency of the Flash memory system is effectively improved by the disclosure.

Figure 5:
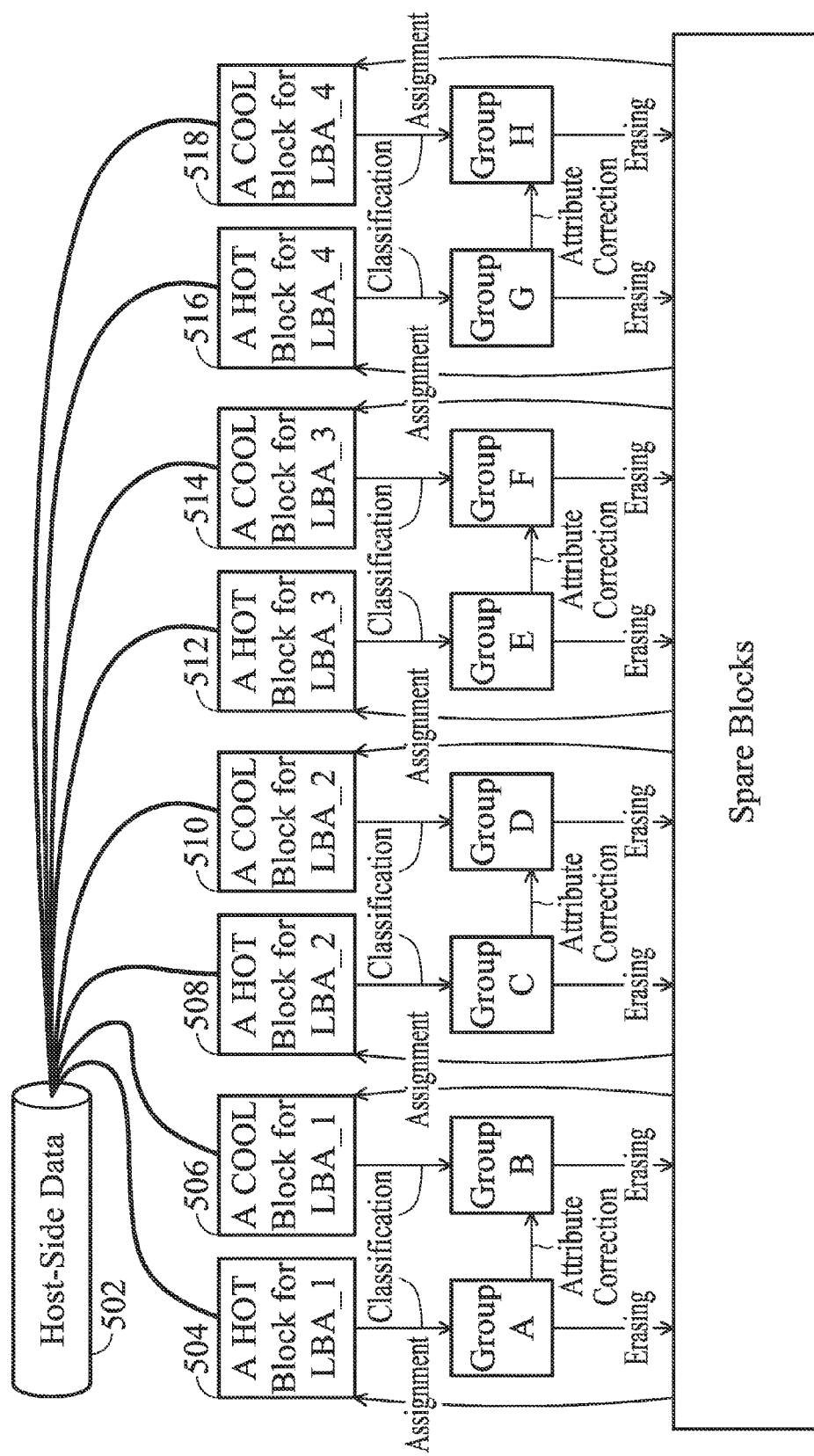
FIG. 5 depicts an exemplary embodiment of the disclosure, wherein the attribute of data is recognized from the logical address and the refresh rate of the data.

In addition to considering the update rate of data, the hierarchical classification of data attribute may further depend on a logical address range of the logical address of the data. FIG. 5 depicts an exemplary embodiment of the disclosure, wherein the data attribute classification depends on a logical address range and an update rate of the data. In this exemplary embodiment, the data attributes are classified into 8 levels, which are based on to four sections of the logical address (labeled as LBA_1, LBA_2, LBA_3 and LBA_4) and two ratings of the update rate (HOT and COOL, indicating a high update rate and a low update rate, respectively.) Data within the logical address range LBA_1 and rated HOT is classified as Level 1. Data within the logical address range LBA_1 and rated COOL is classified as Level 2. Data within the logical address range LBA_2 and rated HOT is classified as Level 3. Data within the logical address range LBA_2 and rated COOL is classified as Level 4. Data within the logical address range LBA_3 and rated HOT is classified as Level 5. Data within the logical address range LBA_3 and rated COOL is classified as Level 6. Data within the logical address range LBA_4 and rated HOT is classified as Level 7. Data within the logical address range LBA_4 and rated COOL is classified as Level 8.

After data attribute recognition, the host-side data 502 is stored to the blocks 504-518 according to recognized data attributes. Block 502, with an attribute of LBA_1 and HOT, is classified as group A. Block 504, with an attribute of LBA_1 and COOL, is classified as group B. Block 508, with an attribute of LBA_2 and HOT, is classified as group C. Block 510, with an attribute of LBA_2 and COOL, is classified as group D. Block 512, with an attribute of LBA_3 and HOT, is classified as group E. Block 514, with an attribute of LBA_3 and COOL, is classified as group F. Block 516, with an attribute of LBA_4 and HOT, is classified as group G. Block 518, with an attribute of LBA_4 and COOL, is classified as group H.

According to step S206 of FIG. 2B, valid data collection process is restricted between blocks of a group. For example, valid data collection process is allowed between the blocks of group A, or, is allowed between the blocks of group B, or, is allowed between the blocks of group C, or, is allowed between the blocks of group D, or, is allowed between the blocks of group E, or, is allowed between the blocks of group F, or, is allowed between the blocks of group G, or, is allowed between the blocks of group H. The blocks released during the valid data collection may be erased as spare blocks 520. The blocks 504 to 518 are selected from the spare blocks 520.

For the logical address range LBA_1, when the HOT blocks classified as group A exceed an upper limit number, one block of group A which has not been updated for a while may be re-labeled as a COOL block or, in a block of group A which has not been updated for a long time, the valid data may be moved to one block of group B. For the other logical address ranges LBA_2 to LBA_4, similar monitor and correction procedures may be performed. Furthermore, the monitor and correction procedures may be performed when the total number of the spare blocks 520 is lower than a lower limit number.

Note that the data attribute may be classified according to other rules, and it is not intended to limit the data attribute classification to the aforementioned examples.

Figure 6:
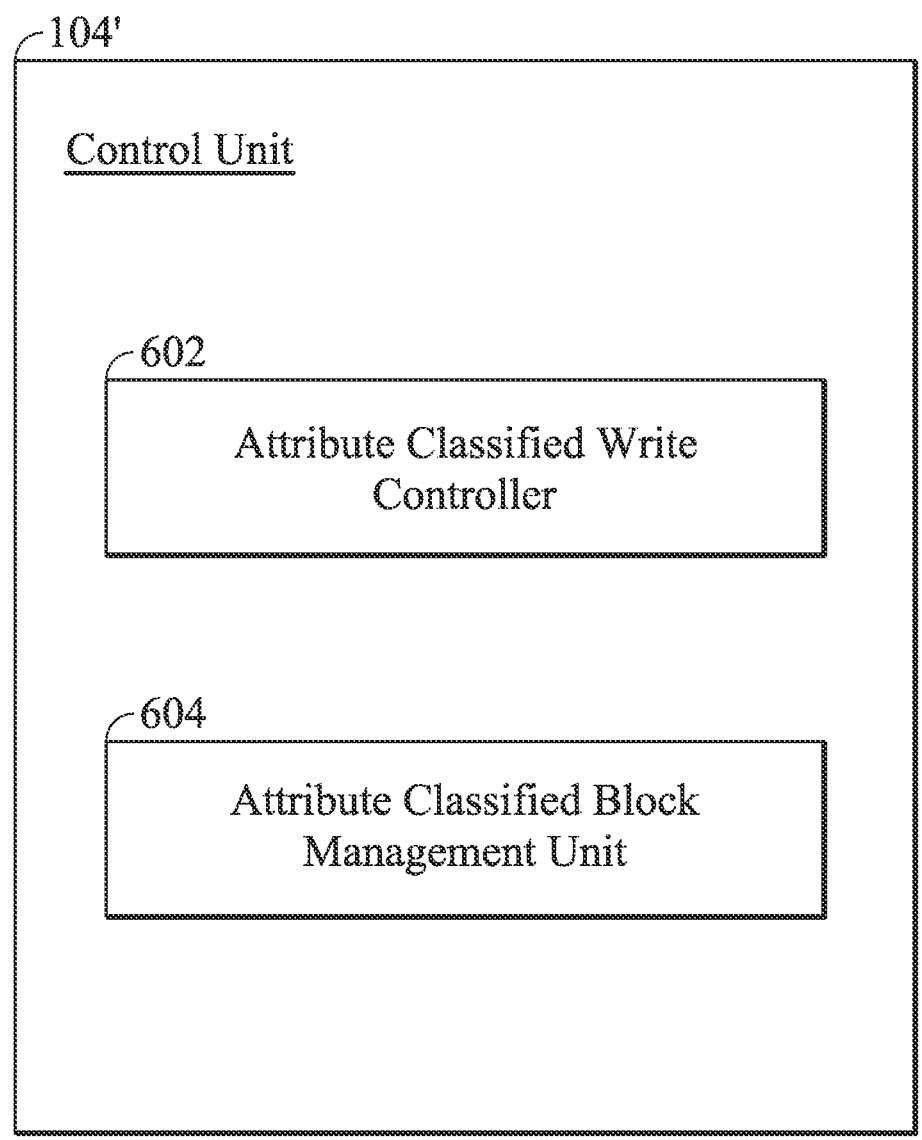
FIG. 6 depicts another exemplary embodiment of the control unit of the disclosure.

Note that the attribute classified write control and the attribute classified block management is not limited to being implemented by the control unit 104 of FIG. 1. FIG. 6 depicts another exemplary embodiment of the control unit of the disclosure. As shown, the control unit 104' comprises an attribute classified write controller 602 and an attribute classified block management unit 604, implementing the aforementioned attribute classified write control and the attribute classified block management, respectively. The attribute classified write controller 602 and the attribute classified block management unit 604 may be implemented by hardware logic gates, or, may be implemented by a software executed by a microcontroller, or, may be implemented by a hardware/software codesign.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control method for a flash memory storage array, comprising:
    recognizing update rates of data transferred from a host; and
    storing data of different levels of update rate into different data reception blocks of the flash memory storage array, wherein the different data reception blocks will be classified into different groups of blocks of the flash memory storage array,
    wherein:
    a valid data collection process, is allowed only between blocks of same group, to release blocks of space; and
    when a total block number of a higher update rate group between the groups of blocks exceeds an upper limit number, erroneous block classification in the higher update rate group is corrected.

2. The control method as claimed in claim 1, further correcting the erroneous block classification in the higher update rate group when a total number of spare blocks of the flash memory storage array is lower than a lower limit number.

3. The control method as claimed in claim 1, further labeling an attribute of each data reception block when assigning each data reception block for data storage, to show which group each data reception block will be classified into.

4. The control method as claimed in claim 3, wherein an attribute of an erroneously classified block in the higher update rate group is re-labeled to correct the erroneous block classification in the higher update rate group.

5. The control method as claimed in claim 3, wherein valid data of an erroneously classified block in the higher update rate group is moved to another block to correct the erroneous block classification in the higher update rate group, and an attribute of the another block correctly corresponds to the valid data moved from the erroneously classified block.

6. The control method as claimed in claim 1, wherein each update rate is estimated based on data size, logical address, data content or historical experience of write operations.

7. The control method as claimed in claim 1, further grouping the blocks of the flash memory storage array based on logical address range.

8. A flash memory, comprising:
    a flash memory storage array; and
    a control unit, placed between the flash memory storage array and a host, comprising:
    an attribute classified write controller, recognizing update rates of data transferred from the host, and storing data of different levels of update rate into different data reception blocks of the flash memory storage array, wherein the different data reception blocks will be classified into different groups of blocks of the flash memory storage array; and an attribute classified block management unit, by which a valid data collection process to release blocks of space is allowed only between blocks of same group and, when a total block number of a higher update rate group between the groups of blocks exceeds an upper limit number, erroneous block classification in the higher update rate group is corrected.

9. The flash memory as claimed in claim 8, wherein the attribute classified block management unit further corrects the erroneous block classification in the higher update rate group when a total number of spare blocks of the flash memory storage array is lower than a lower limit number.

10. The flash memory as claimed in claim 8, wherein the attribute classified write controller further labels an attribute of each data reception block when assigning each data reception block for data storage, to show which group each data reception block will be classified into.

11. The flash memory as claimed in claim 10, wherein an attribute classified block management unit re-labels the attribute of an erroneously classified block in the higher update rate group to correct the erroneous block classification in the higher update rate group.

12. The flash memory as claimed in claim 10, wherein the attribute classified block management unit moves valid data of an erroneously classified block in the higher update rate group to another block to correct the erroneous block classification in the higher update rate group, and an attribute of the another block correctly corresponds to the valid data moved from the erroneously classified block.

13. The flash memory as claimed in claim 8, wherein the attribute classified write controller estimates each update rate based on data size, logical address, data content or historical experience of write operations.

14. The flash memory as claimed in claim 8, wherein the attribute classified write controller further groups the blocks of the flash memory storage array based on logical address range.

* * * * *